United States Patent [19]
Sato et al.

[11] Patent Number: 6,069,717
[45] Date of Patent: May 30, 2000

[54] COLOR IMAGE READING APPARATUS AND A METHOD OF READING A COLOR IMAGE

[75] Inventors: Shinichi Sato, Yokohama; Kazuyuki Nishimura, Ichikawa, both of Japan

[73] Assignee: Matsushita Graphic Commication Systems, Inc., Japan

[21] Appl. No.: 08/690,446

[22] Filed: Jul. 29, 1996

[30] Foreign Application Priority Data

Jul. 28, 1995 [JP] Japan .................................. 7-193030

[51] Int. Cl.$^7$ .................................................. H04N 1/46
[52] U.S. Cl. ........................ 358/530; 358/528; 358/451
[58] Field of Search .................................. 358/530, 528, 358/448, 451, 496; 382/298

[56] References Cited

U.S. PATENT DOCUMENTS

| | | | |
|---|---|---|---|
| 4,750,048 | 6/1988 | Satoh et al. ............................. | 358/528 |
| 4,953,014 | 8/1990 | Takaragi .................................. | 358/451 |
| 5,280,365 | 1/1994 | Nannichi et al. ........................ | 358/451 |

*Primary Examiner*—Thomas D. Lee
*Attorney, Agent, or Firm*—Rossi & Associates

[57] ABSTRACT

A color image reading apparatus comprises: first to $N^{th}$ (color line image) sensors for receiving respective color images from the projected image and respectively generating first to $N^{th}$ (color) signals, the first to $N^{th}$ sensors respectively extending in a main scanning direction and being arranged in a sub-scanning direction SD in order from the first to $N^{th}$ sensors with different pitches between the first to $(N-1)^{th}$ sensors and the $N^{th}$ sensor; a receiving circuit for receiving an enlargement ratio and for supplying a scanning pitch according to the enlargement ratio; a scanning unit responsive to the scanning pitch for scanning the image against the first to $N^{th}$ sensors in the SD at the scanning pitch in the order, wherein lines of the first to $(N-1)^{th}$ sensors deviate from the lines of the $N^{th}$ sensor according to the enlargement ratio; and a line combining portion for selecting one of lines of each of the first to $(N-1)^{th}$ signals closest to the present line of the $N^{th}$ signal, combining the selected one of lines each of the first to $(N-1)^{th}$ signals with the present line of the $N^{th}$ signal, and for outputting the combined color signals.

A secondly closest line may be determined and selected through a random operation or a weighted operation. The corresponding method of reading a color image is also disclosed.

14 Claims, 13 Drawing Sheets

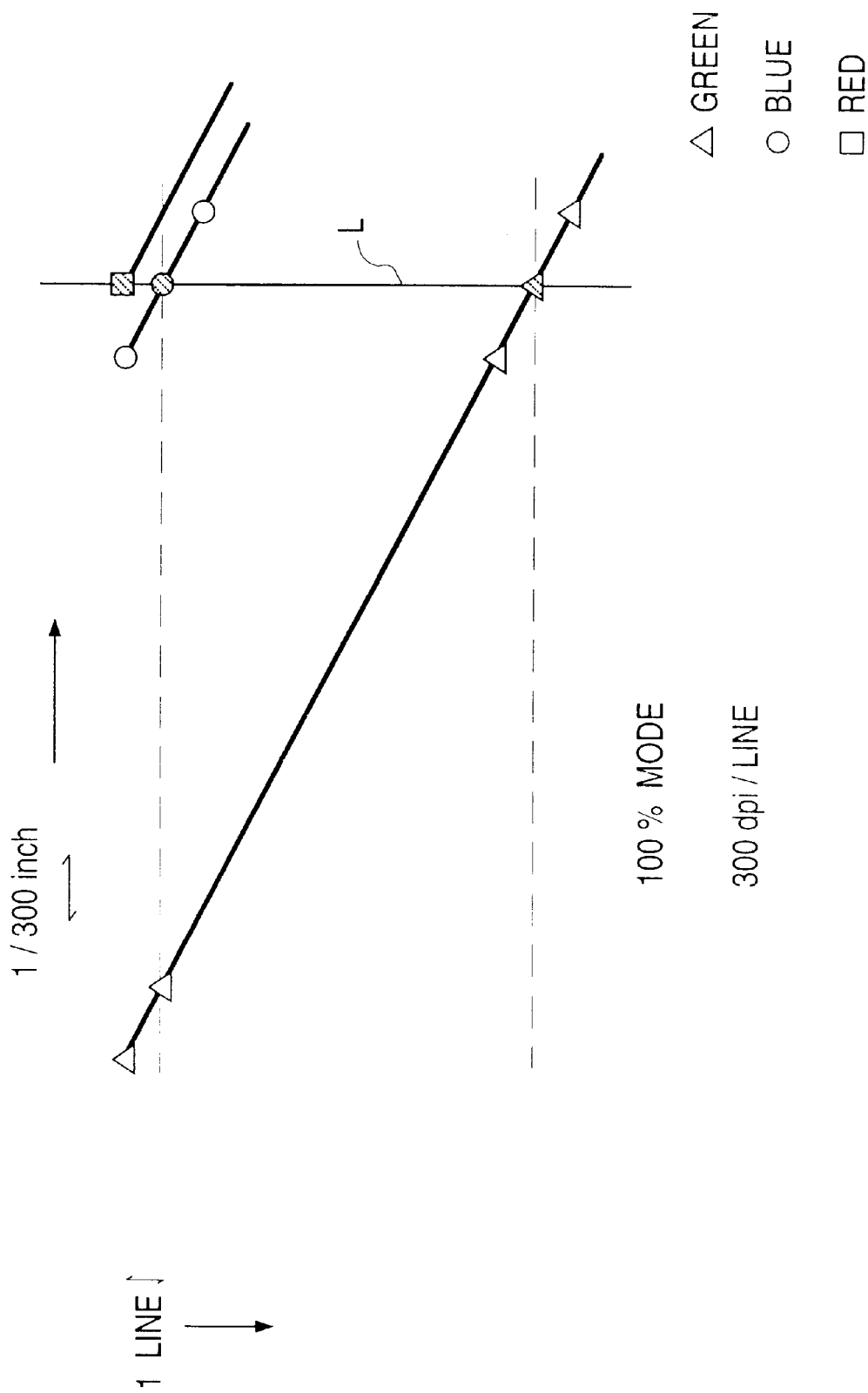

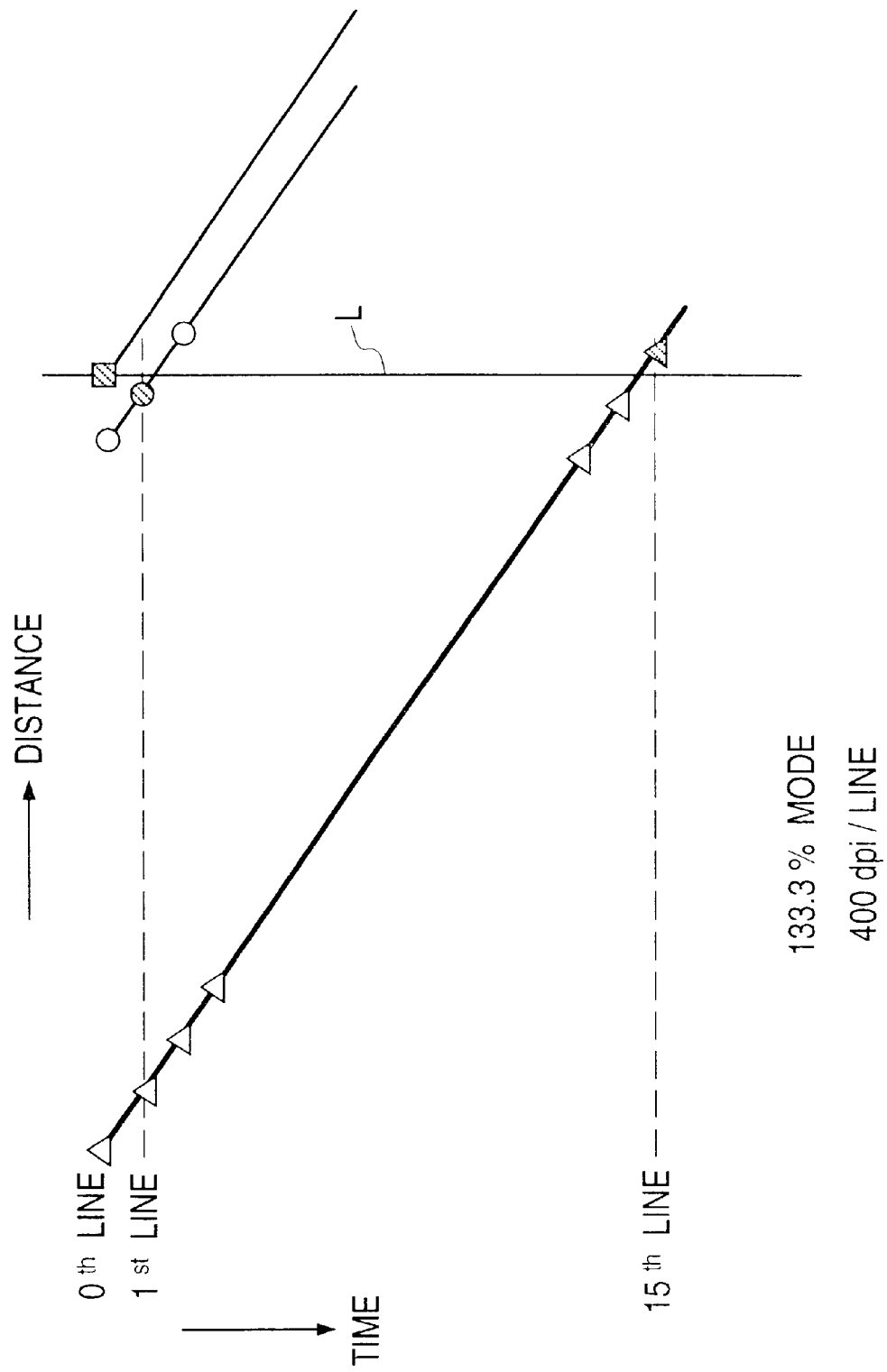

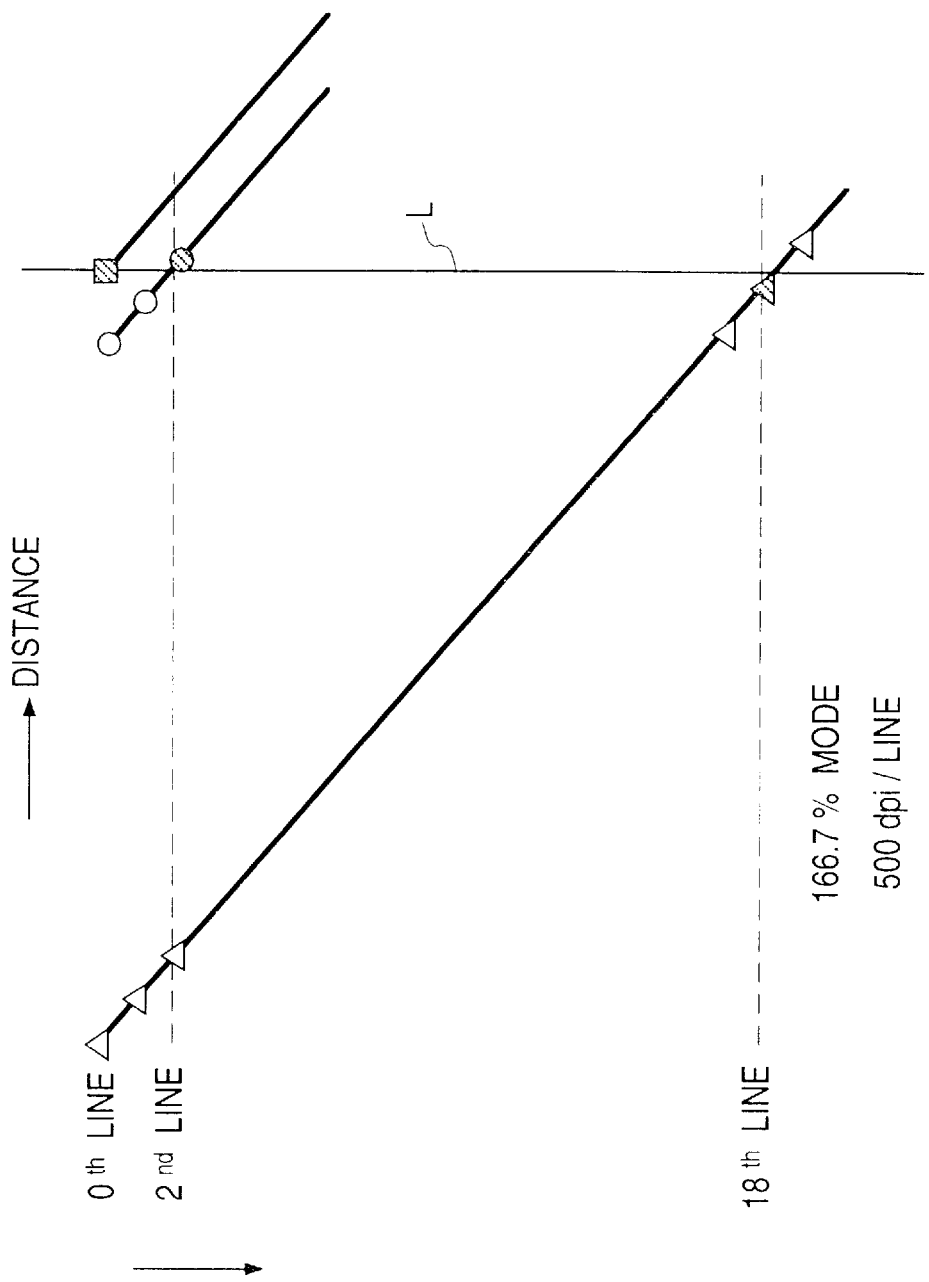

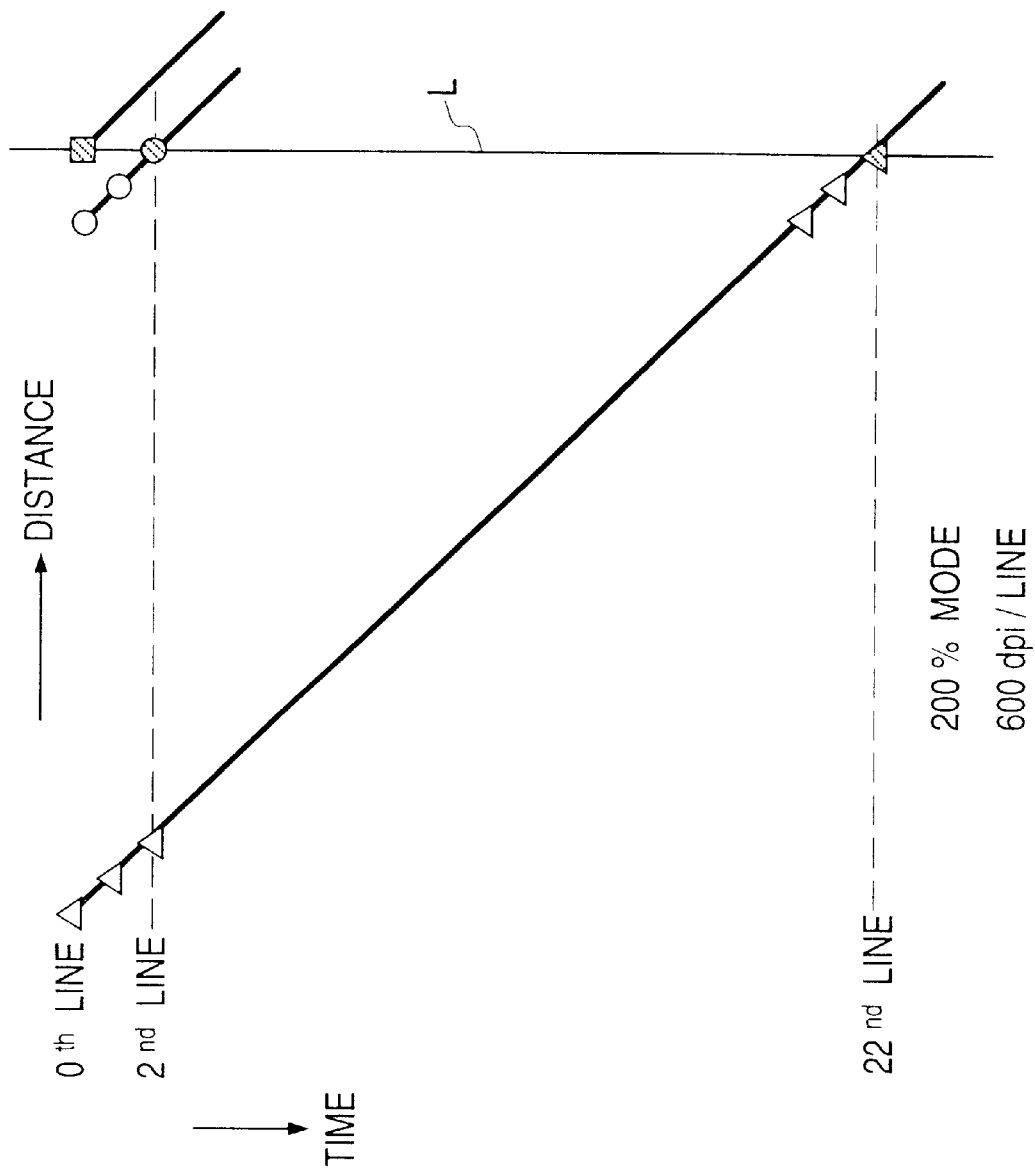

COLOR IMAGE READING APPARATUS AND A METHOD OF READING A COLOR IMAGE

BACKGROUND OF THE INVENTION

1. Field of the Invention

This invention relates to a color image reading apparatus and a method of reading a color image.

2. Description of the Prior Art

A color image reading apparatus, including color line image sensors arranged in a sub-scanning direction with predetermined intervals, for reading an image and outputting color signals is known. FIG. 2 is an illustration of a prior art color line image sensor device. A prior art image reading apparatus using the line image sensor device shown in FIG. 2 reads and outputs color signals with output timings of the color signals adjusted in accordance with intervals between respective color line image sensors and fixed scanning pitch in the main scanning direction. A blue color image sensor 4c is apart from a red color image sensor 4a by 14 $\mu$m, i.e., one line of 300 dots/inch, and a green color image sensor 4b is apart from the red color image sensor 4a by 154 $\mu$m, i.e., eleven lines of 300 dots/inch. The scanning pitch is defined by the intervals between these color line sensors, that is, one line of 300 dots/inch. In this color image reading apparatus, enlargement is effected by line interpolating. The line interpolating provides a maximum enlargement ratio, for example 200%, and then the color image reading apparatus skipingly outputs the interpolated color signals to obtain a desired enlargement ratio, for example 110%.

SUMMARY OF THE INVENTION

The aim of the present invention is to provide an improved image reading apparatus and an improved method of reading a color image.

According to this invention a first image reading apparatus is provided which comprises: a CCD line image sensors having a plurality of photoelectric conversion elements for reading red, green blue images; a carriage portion for carrying a copy; a changing portion for changing a carrying speed of the carriage portion in accordance with an enlargement ratio; and an inter-line compensation portion for outputting red, green, and blue signals from the CCD line image sensors with output timings of the red, green, and blue signals adjusted to combine respective the red, green, and blue signals to have each of line.

In the first image reading apparatus, the carriage portion and the changing portion generate deviations of lines of two of the red, green, and blue signals from the line of the remaining signal in accordance with the enlargement ratio and the inter-line compensation portion compensates the deviation by outputting the red, green, and blue signals by changing outputting timings of the red, green, and blue signals so as to select one of lines of the two of the red, green and blue signals closest to the line to be read.

In the first image reading apparatus, the carriage portion and the changing portion generate deviations of lines of two of the red, green, and blue signals from the line of the remaining signal in accordance with the enlargement ratio and the inter-line compensation portion compensates the deviation by outputting the red, green, and blue signals by changing outputting timings of the red, green, and blue signals so as to select either of lines of the two of the red, green and blue signals firstly closest or secondly closest to the line to be read. Moreover, the inter-line compensation portion may select either of lines of the two of the red, green and blue signals firstly closest or secondly closest to the line to be read through a random number operation. Moreover, the inter-line compensation portion may select either of lines of the two of the red, green and blue signals firstly closest or secondly closest to the line to be read through a random number operation in accordance with ratios of distances between the lines of two of the red, green and blue signal and the remaining signal.

According to this invention, a second color image reading apparatus is provided which comprises: an optical system for projecting an image on an image plane; first to $N^{th}$ color line image sensors for receiving respective color images from the projected image on the image plane and respectively generating first to $N^{th}$ color signals, the first to $N^{th}$ color line image sensors respectively extending in a main scanning direction and being arranged in a sub-scanning direction in order from the first to $N^{th}$ color line image sensors with different pitches between the first to $(N-1)^{th}$ color line image sensors and the $N^{th}$ color line image sensor; an enlargement ratio data receiving circuit for receiving data of an enlargement ratio and for supplying data of a scanning pitch in accordance with the enlargement ratio; a scanning unit responsive to the data of the scanning pitch for scanning the image against the first to $N^{th}$ color line image sensors in the sub-scanning direction at the scanning pitch in the order, wherein lines of the first to $(N-1)^{th}$ color line image sensors deviate from the lines of the $N^{th}$ color line image sensor in accordance with the enlargement ratio; and a line combining portion for selecting one of lines of each of the first to $(N-1)^{th}$ color signals closest to the present line of the $N^{th}$ color signal, combining the selected one of lines each of the first to $(N-1)^{th}$ color signals with the present line of the $N^{th}$ color signal, and for outputting the combined color signals.

According to this invention a third color image reading apparatus is provided which comprises: an optical system for projecting an image on an image plane; first to $N^{th}$ color line image sensors for receiving respective color images from the projected image on the image plane and respectively generating first to $N^{th}$ color signals, the first to $N^{th}$ color line image sensors respectively extending in a main scanning direction and being arranged in a sub-scanning direction in order from the first to $N^{th}$ color line image sensors with different pitches between the first to $(N-1)^{th}$ color line image sensors and the $N^{th}$ color line image sensor; an enlargement ratio data receiving circuit for receiving data of an enlargement ratio and for supplying data of a scanning pitch in accordance with the enlargement ratio; a scanning unite responsive to the data of the scanning pitch for scanning the image against the first to $N^{th}$ color line image sensors in the sub-scanning direction at the scanning pitch in the order, wherein lines of the first to $(N-1)^{th}$ color line image sensors deviate from the lines of the $N^{th}$ color line image sensor in accordance with the enlargement ratio; and a determining portion for determining first one of lines of each of the first to $(N-1)^{th}$ color signals closest to the present line of the $N^{th}$ color signal and second one of lines of each of the first to $(N-1)^{th}$ color signals secondly closest to the present line of the $N^{th}$ color signal; a selecting portion for randomly selecting either of the first one of line of each of the first to $(N-1)^{th}$ color signals or the second one of line of each of the first to $(N-1)^{th}$ color signals at a ratio; a line combining portion for combining the one of lines of each of the first to $(N-1)^{th}$ color signals selected with the present line of the $N^{th}$ color signal and for outputting the combined color signals.

The third color image reading apparatus, may further comprise: a detecting portion for detecting a first deviation between the first one of line of each of the first to $(N-1)^{th}$ color signals and the present line of the $N^{th}$ color signal and second deviation between the second one of line of each of the first to $(N-1)^{th}$ color signals and the present line of the $N^{th}$ color signal; and a weighting portion for weighting the ratio in accordance with the detected first and second deviation.

According to this invention, a first method of reading a color image is provided which comprises the steps of: projecting an image on an image plane; providing first to $N^{th}$ color line image sensors for receiving respective color images from the projected image on the image plane and respectively generating first to $N^{th}$ color signals, the first to $N^{th}$ color line image sensors respectively extending in a main scanning direction and being arranged in a sub-scanning direction in order from the first to $N^{th}$ color line image sensors with different pitches between the first to $(N-1)^{th}$ color line image sensors and the $N^{th}$ color line image sensor; receiving data of an enlargement ratio and for supplying data of a scanning pitch in accordance with the enlargement ratio; scanning the image against the first to $N^{th}$ color line image sensors in the sub-scanning direction at the scanning pitch in the order in response to the data of the scanning pitch, wherein lines of the first to $(N-1)^{th}$ color line image sensors deviate from the lines of the $N^{th}$ color line image sensor in accordance with the enlargement ratio; and selecting one of lines each of the first to $(N-1)^{th}$ color signals closest to the present line of the $N^{th}$ color signal; combining the selected one of lines of each of the first to $(N-1)^{th}$ color signals with the present line of the $N^{th}$ color signal; and outputting the combined color signals.

According to this invention, a second method of reading a color image is provided which comprises the steps of: projecting an image on an image plane; providing first to $N^{th}$ color line image sensors for receiving respective color images from the projected image on the image plane and respectively generating first to $N^{th}$ color signals, the first to $N^{th}$ color line image sensors respectively extending in a main scanning direction and being arranged in a sub-scanning direction in order from the first to $N^{th}$ color line image sensors with different pitches between the first to $(N-1)^{th}$ color line image sensors and the $N^{th}$ color line image sensor; receiving data of an enlargement ratio and for supplying data of a scanning pitch in accordance with the enlargement ratio; scanning the image against the first to $N^{th}$ color line image sensors in the sub-scanning direction at the scanning pitch in the order in response to the data of the scanning pitch, wherein lines of the first to $(N-1)^{th}$ color line image sensors deviate from the lines of the $N^{th}$ color line image sensor in accordance with the enlargement ratio; and determining first one of lines of each of the first to $(N-1)^{th}$ color signals closest to the present line of the $N^{th}$ color signal and second one of lines of each of the first to $(N-1)^{th}$ color signals secondly closest to the present line of the $N^{th}$ color signal; randomly selecting either of the first one of line of each of the first to $(N-1)^{th}$ color signals or the second one of line of each of the first to $(N-1)^{th}$ color signals at a ratio; combining the one of lines of each of the first to $(N-1)^{th}$ color signals selected with the present line of the $N^{th}$ color signal; and outputting the combined color signals.

The second method may further comprise the steps of: detecting a first deviation between the first one of line of each of the first to $(N-1)^{th}$ color signals and the present line of the $N^{th}$ color signal and second deviation between the second one of line of each of the first to $(N-1)^{th}$ color signals and the present line of the $N^{th}$ color signal; and weighting the ratio in accordance with the detected first and second deviations.

BRIEF DESCRIPTION OF THE DRAWINGS

The object and features of the present invention will become more readily apparent from the following detailed description taken in conjunction with the accompanying drawings in which:

FIG. 5 is an illustration of the first embodiment illustrating the inter-line compensation at 300 dpi (100% mode);

FIG. 6 is an illustration of the first embodiment illustrating the inter-line compensation at 400 dpi (133.3% mode);

FIG. 7 is an illustration of the first embodiment illustrating the inter-line compensation at 500 dpi (166.7% mode);

FIG. 8 is an illustration of the first embodiment illustrating the inter-line compensation at 600 dpi (200% mode);

The same or corresponding elements or parts are designated with like references throughout the drawings.

DETAILED DESCRIPTION OF THE INVENTION

Hereinbelow will be described a first embodiment of this invention.

Figure 1:
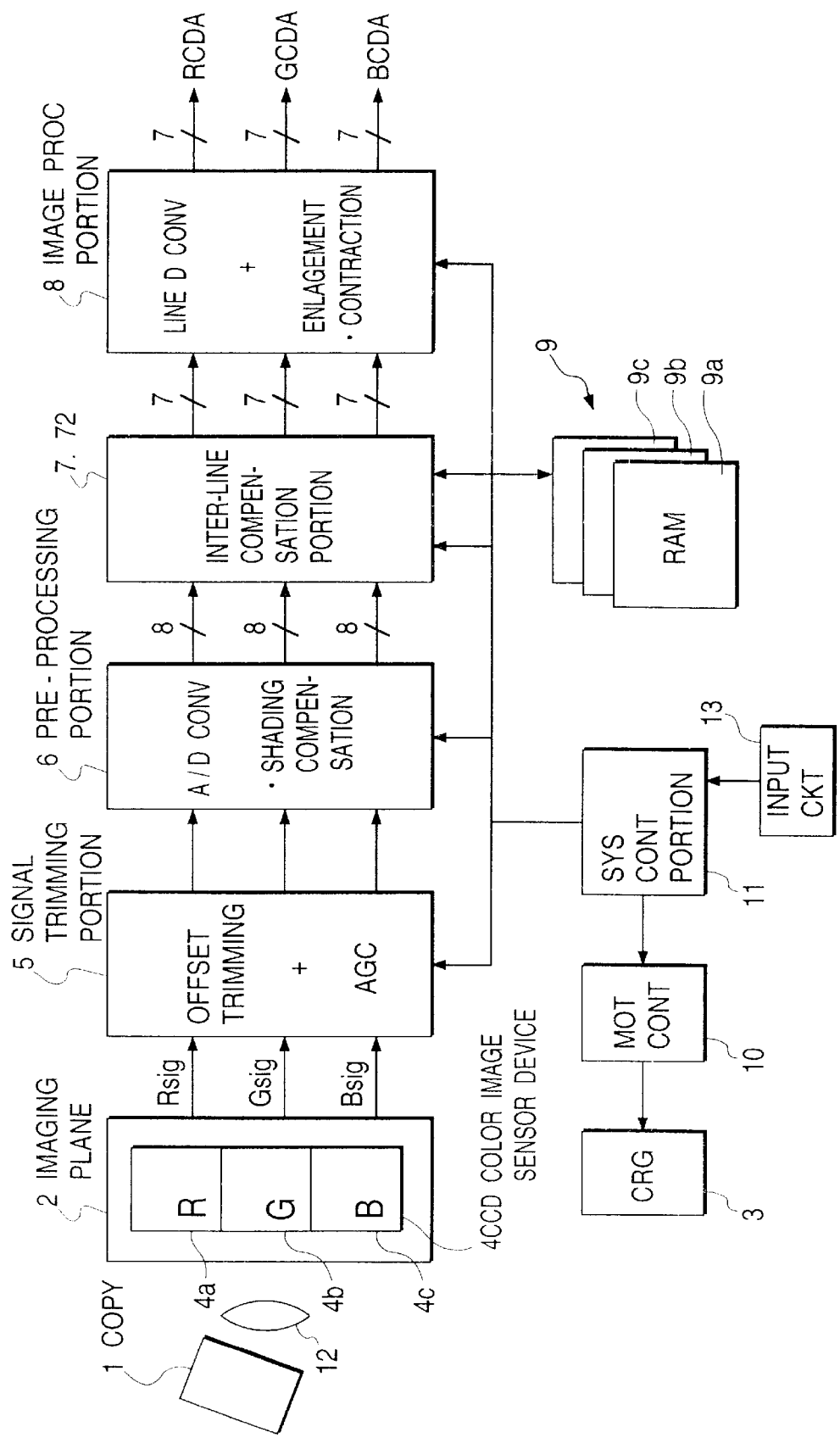
FIG. 1 is a block diagram of a color image reading apparatus of a first embodiment of this invention.

FIG. 1 is a block diagram of a color image reading apparatus of the first embodiment of this invention.

The image reading apparatus of the first embodiment comprises a lens system 12 for imaging an image on a copy 1 on an imaging plane 2, a CCD (charge coupled device) color line image sensor device 4, including a red line image sensor 4a, a green line image sensor 4b, and a blue line image sensor 4c, for receiving the image formed on the imaging plane 2 and outputting red, green and blue color signals, a signal trimming portion 5 effecting an offset trimming and an automatic gain controlling (AGC), a pre-processing portion 6 for effecting an A/D conversion and a shading compensation, an inter-line (between lines) compensation portion 7 for effecting an inter-line compensation, an image processing portion 8 for effecting a line density conversion and an enlargement or contraction processing, RAMs 9 for the inter-line compensation, including a RAM 9a for storing the red signal, a RAM 9b for storing the green signal, and a RAM 9c for storing the blue signal, a carriage 3 for providing scanning the image on the imaging plane against the color image sensor device 4, a motor control portion 10 for driving the carriage 3, a system control portion 11 for controlling the signal trimming portion 5, the pre-processing portion 6, the inter-line compensation portion 7, the image processing portion 8, and the motor control portion 10, and an input circuit 13 for inputting an enlargement ratio and a start command.

The lens system 12 images the image on the copy 1 on the imaging plane 2. The red line image sensor 4a receives a red image of the image formed on the imaging plane 2 and outputting red color signal. The green line image sensor 4b receives a green image of the image formed on the imaging plane 2 and outputs the green color signal. The blue line image sensor 4c receives a blue image of the image formed on the imaging plane 2 and outputs the blue color signals. The signal trimming portion 5 effects the offset trimming to suppress offsets in the red, green, and blue line image sensors 4a to 4c and controls gains of the red, green and blue color signals. The pre-processing portion 6 A/D-converts the red, green, and blue color signals and compensates the shading, i.e. unevenness of illumination to the copy 1 or an unevenness of brightness due to the optical structure. The inter-line compensation portion 7 effects timing controlling for compensating timings of color signals due to an offset arrangement of respective color line image sensors 4a to 4c to form one line of color signals. The image processing portion 8 effects the line density conversion and the enlargement or contraction processing.

The carriage 3 feeds the copy to provide scanning the image on the imaging plane against the color image sensor device 4. The motor control portion 10 drives the carriage 3. The system control portion 11 controls the signal trimming portion 5, the pre-processing portion 6, the line interpolating portion 7, the image processing portion 8, and the motor control portion 10. The input circuit 13 receives the enlargement ratio and the start command and supplies them to the system control portion 11.

When the input circuit 13 receives the enlargement ratio, the system control portion calculates a feeding rate or a feeding pitch of the copy 1 in accordance with the enlargement ratio and controls the motor control portion 10 to provide the feeding rate in the sub-scanning direction S2. When the enlargement ratio is 1.2, the feeding rate or feeding pitch is set to 1/1.2 of the feeding rate at the enlargement ratio of 1:1 When the enlargement ratio is 1.5, the feeding rate or the feeding pitch is set to 1/1.5 of the feeding rate at the enlargement ratio of 1:1.

The inter-line compensation portion 7 compensates output timings of color signals varied in accordance with the enlargement ratio because the feeding rate is changed in accordance with the enlargement ratio.

Figure 2:
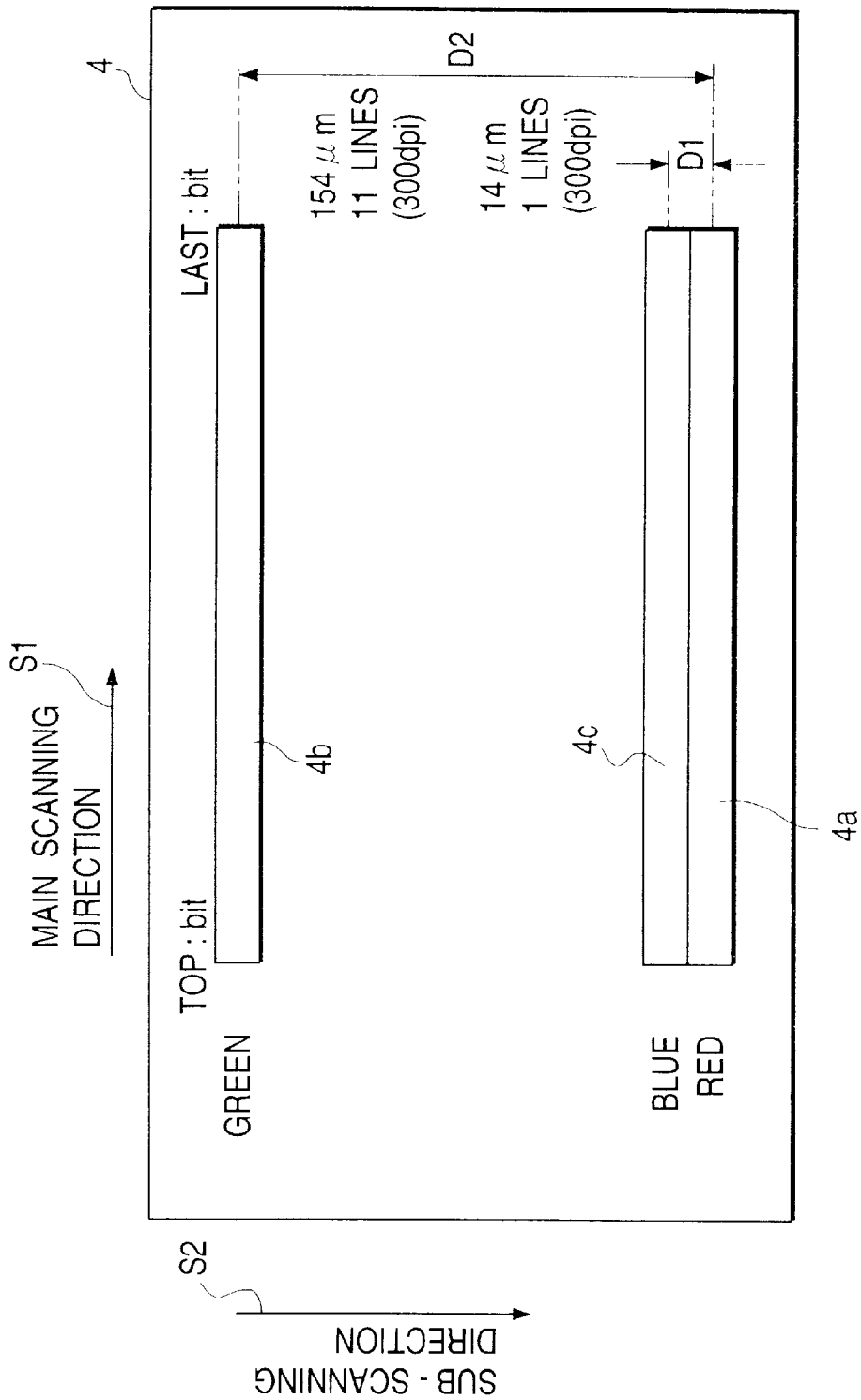
FIG. 2 is an illustration of an arrangement of a prior art color line image sensors which is also used in the first and second embodiments of this invention.

FIG. 2 is an illustration of an arrangement of a prior art color line image sensors 4a to 4c which is also used in this embodiment of this invention.

The line image sensor (green line image sensor) 4b for receiving the green image is apart from the line image sensor (red line image sensor) 4a for receiving the red image by 154 μm, i.e., 11 lines at 300 dpi (dot/inch) in the sub-scanning direction S2. The line image sensor (blue line image sensor) 4c for receiving the blue image is apart from the line image sensor 4a for the red image by 14 μm, i.e., one line at 300 dpi in the sub-scanning direction S2.

When the image on the imaging plane 2 is read at 300 dpi, at first, the green line image sensor 4b receives a specific line of the green image and after scanning of 10 lines, the blue line image sensor 4c receives the same specific line of the blue image. Then, after one scanning line, the red line image sensor 4a receives the same specific line of the red image.

The inter-line compensation portion 7 once stores and then, reads the color signals to compensates the output timings of the color signals due to the offset arraignment of the respective color line image sensors 4a to 4c.

When the enlargement ratio is varied, the resolution is changed to 300 dpi, 400 dpi, 500 dpi, and 600 dpi. Then, intervals between the line image sensors 4a and 4b and between the line image sensors 4a and 4c represented by the number of lines are also varies as follows:

|  | 300 dpi | 400 dpi | 500 dpi | 600 dpi. |
|---|---|---|---|---|
| R-B | 1 line | 1 line (1 × 4/3 = 1.33) | 2 lines (1 × 5/3 = 1.66) | 2 lines (1 × 6/3 = 2 |
| R-G | 11 lines | 15 lines (11 × 4/3 = 14.66) | 18 lines (18 × 5/3 = 18.33) | 22 lines (11 × 6/3 = 22, | wherein R-B denotes the interval between the red line image sensor 4a and the blue line image sensor 4c and R-G denotes the interval between the red line image sensor 4a and the green line image sensor 4b.

Figure 3:
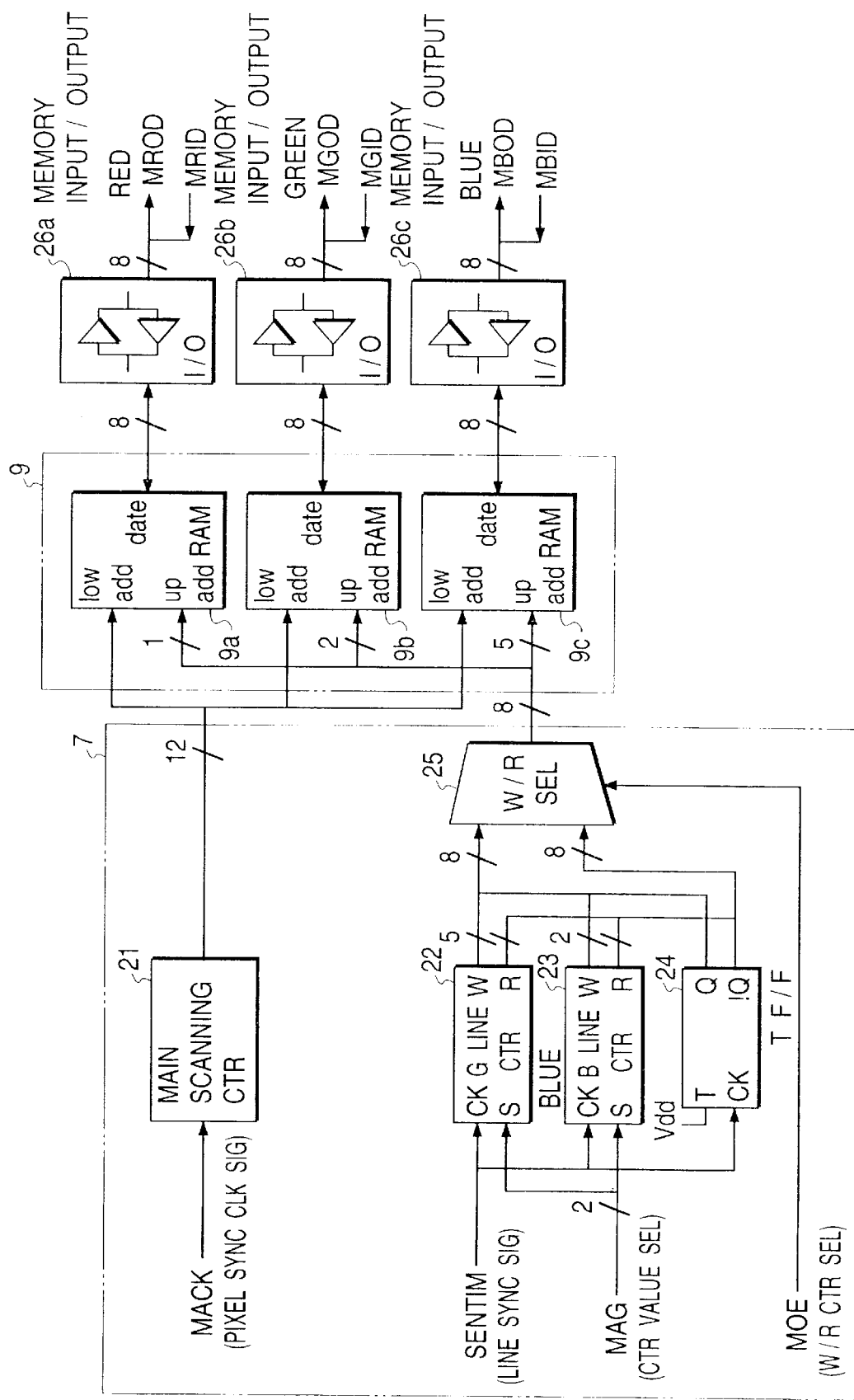
FIG. 3 is a block diagram of the inter-line compensation portion of the first embodiment.

FIG. 3 is a block diagram of the inter-line compensation portion 7 of the embodiment.

The inter-line compensation portion 7 comprises a main scanning counter 21 for counting pulses of the pixel synchronizing signal (MACK), a green line counter 22, responsive to a line synchronizing signal (SENTIM) and a counter value selection signal (MAG), for counting lines of the green signal and outputting a green reading address signal (R) of the green signal or a green writing address signal (W) of the green signal, a blue line counter 23, responsive to the line synchronizing signal (SENTIM) and the counter value selection signal (MAG), for counting lines of the blue signal and outputting a blue reading address signal (R) of the blue signal or a blue writing address signal (W) of the blue signal, and a red line counter 24, responsive to the line synchronizing signal (SMTIM) and a Vdd signal, for detecting completion of one line of the red signal and a W/R selector 25 responsive to a W/R counter selection signal (MOE) for selects either of the reading address signals from the green, blue, and red counters 22 to 24 or the writing address signals from the green, blue, and red counters 22 to 24 in accordance with the W/R and supplies selected signals to the memories 9. Outputs of the main scanning counter 21 indicative of lower address data and the outputs of W/R selector 25 indicative of upper address data are supplied to RAMs 9a to 9c for green, blue, and red signals respectively. Color signals (data) are read from the RAMs 9a to 9c in response to data output signals MROD, MGOD, and MBOD and color signals are written in the RAMs 9a to 9c in response to data input signal GRID, MGID, and MBID. The green line counter 22 and the blue line counters 22 and 23 are supplied with the MAG signal to respectively set periods determined by the resolution.

An operation will be described.

In this embodiment, the reading operation at a resolution of 300 dpi, i.e., an enlargement ratio of 100%, is assumed as a standard mode and other resolutions of 400 dpi (133%), 500 dpi (166%), and 600 dpi (200%) in addition of 100% are assumed as standard resolutions or standard enlargement ratios (resolutions). When a desired enlargement ratio other than these standard enlargement ratios is set, one of the standard enlargement ratios which is larger than the enlargement ratio commanded is selected and the image is read and stored at the selected enlargement ratio. Then, the stored color signals are read skipingly to provide color signals having the desired enlargement ratio. The standard enlargement ratios can be set freely, for example, to 150% (400 dpi) or 183% (550 dpi).

Figure 4A:
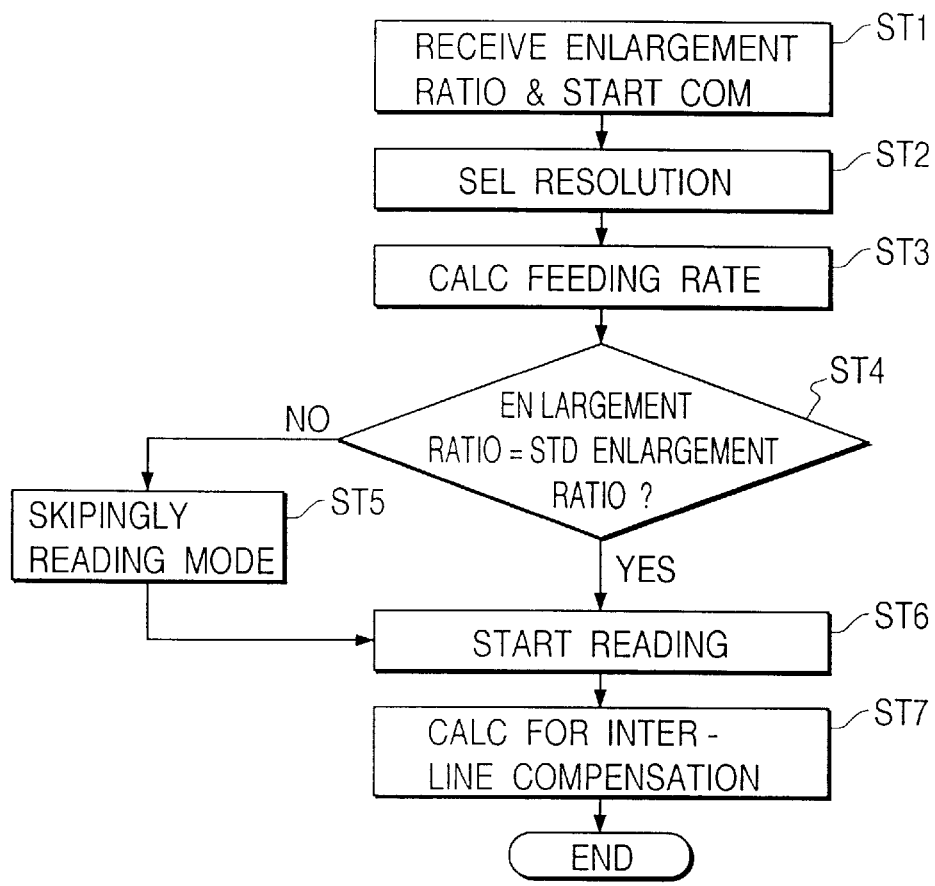
FIG. 4A is a diagram of a flow chart of a reading operation of the first embodiment.

FIG. 4A is a diagram of a flow chart of a reading operation of this embodiment. When the reading operation starts, the system control portion 11 receives a desired enlargement ratio and a start command. In step st2, the system control portion 11 selects one of the standard resolutions and the corresponding standard enlargement ratio which is larger than the enlargement ratio commanded. For example, an enlargement ratio of 150% is commanded, the standard resolution of 500 dpi, that is, the standard enlargement ratio 5/3 (133%) are selected because the standard enlargement ratio 6/3 (200%) is also larger than the commanded enlargement ratio. However, the standard enlargement ratio of 5/3 is favorable, because an amount of data to be treated is less that the case of the standard enlargement ratio of 6/3. In step st3, the feeding rate is determined in accordance with the selected standard resolution, that is, 500 dpi. The motor control portion controls a motor (not shown) to provide the feeding rate or a feeding pitch corresponding the 500 dpi.

In step st4, the system control portion 11 makes a decision as to whether or not the commanded enlargement ratio corresponds to one of the standard enlargement ratios. If the commanded enlargement ratio corresponds to one of the standard enlargement ratios, the system control portion 11 starts reading the copy 1. If the commanded enlargement ratio does not correspond to any of the standard enlargement ratios, the system control portion 11 sets the image processing portion 8 to the skipingly reading mode in step st5 and then, starts reading the copy 1 in step st6. As mentioned, when the enlargement ratio is 150%, this enlargement ratio does not agree the enlargement ratio of 5/3 (166%), so that the system control portion 11 sets the skipingly reading mode in step st5 and then, the system control portion 11 starts reading the copy 1 in step st6. In the following step st7, the system control portion 11 effects calculations for the inter-line operation and supplies the result to the inter-line compensation portion 7.

Figure 4B:
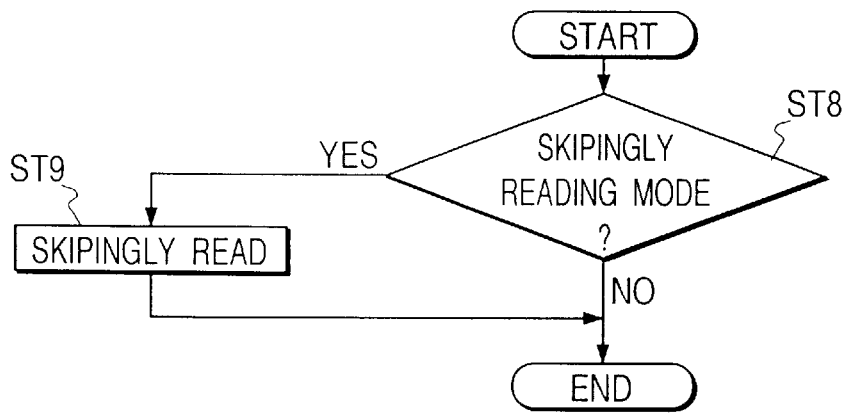
FIG. 4B is a diagram of a flow chart of the first embodiment showing an operation of the image processing portion.

FIG. 4B is a diagram of a flow chart of this embodiment showing an operation of the image processing portion 8. In step st8, the image processing portion 8 makes a decision as to whether or not the skipingly reading mode has been set. If the skipingly reading mode has been set, the image processing portion 8 effects skipingly reading operation to provides the desired enlargement ratio. If the skipingly reading mode has not been set, the image processing portion does not effects the skipingly reading mode.

When the reading operation starts, the image on the copy 1 illuminated by an illumination portion (not shown) is projected to the image plane 2. Then, the green line image sensor 4c receives the green image of the first line of the copy 1 and supplies the green color signal to the signal trimming portion 5. The motor control portion 10 drives the carriage to feed the copy 1 at the feeding rate corresponding to the resolution ratio of 500 dpi. The green color signal is subjected to the offset trimming by the signal trimming portion 5, the a/d conversion and shading compensation by the pre-processing portion 6 and supplied to the inter-line compensation portion 7. The inter-line compensation portion 7 stores the green color signal until the red line image sensor 4a reads the first line of the copy 1. Then, the inter-line compensation portion 7 outputs the green, blue, and red color signals of the first line of the copy 1 at the same time by reading these color signals from the RAMs 9 such that the inter-line compensation is provided.

The image processing portion 8 stores the green, blue, and red color signals and skipingly outputs them to provide the desired enlargement ratio of 150% from the color data of 166%.

An operation of the inter-line compensation will be described. FIG. 5 is an illustration of this embodiment illustrating the inter-line compensation at 300 dpi (100% mode). FIG. 6 is an illustration of this embodiment illustrating the inter-line compensation at 400 dpi (133.3% mode). FIG. 7 is an illustration of this embodiment illustrating the inter-line compensation at 500 dpi (166.7% mode). FIG. 8 is an illustration of this embodiment illustrating the inter-line compensation at 600 dpi (200% mode).

In FIGS. 5 to 8, the square marks denote the red color signal read by the red color line image sensor 4a, the triangle marks denote the green color signal read by the green color line image sensor 4b, and the round marks denote the blue color signal read by the blue color line image sensor 4c. In the illustrations from FIGS. 5 to 8, the horizontal direction represents a distance of lines of respective colors and the vertical direction represents time (reading timing). Thus, in the 100% mode, at first, 0th line of the green signal is read by the green color line image sensor 4b, and then, the first line of the green signal is read by the green color line image sensor 4b also. Then, when the eleventh line of the green signal is read by the green color line image sensor 4b, 0th line of the red signal is read by the red color line image sensor 4a and the first line of the blue signal is read by the blue color line image sensor 4c. As shown in the drawing, at the 300 dpi, when the red color signal is read by the red color image sensor 4c, the blue color line image sensor 4c reads the blue signal apart from the 0th line of the red color signal by just one line of 300 dpi and the green color line image sensor 4b reads the green signal apart from the $0^{th}$ line of the red color signal by just eleven line of 300 dpi. That is, the $0^{th}$ line of the red color signal, the first line of the blue signal, and the eleventh line of the green signal perfectly overlap each other. More specifically, the square mark, the round mark, and the triangle mark which are hatched arranges on the same line L (referred to as an ideal line). Therefore, the inter-line compensation portion 7 adjusts reading output of the read blue, and green color signals such that the intervals between the green and blue color image sensors are read to match the reading timings of the red color signal to form one line of color signals.

In the 133.3% mode, that is 400 dpi, as shown in FIG. 6, at first, 0th line of the green signal is read by the green color line image sensor 4b, and then, the first line of the green signal is read by the green color line image sensor 4b also. However, the intervals between the red and green line image sensors and between the red and blue line image sensors is not integer times the feeding rate. Therefore, the lines of red, blue, and green signals do not agree each other. Then, assuming that the line of the red signal is an ideal line L, the blue signal of one line prior to the ideal ling L (hatched round mark) is selected for the ideal line L. That is, the blue signal of one line prior to the ideal line L is closer to the ideal line L than the blue signal of two lines prior to the ideal line L with respect to the reading timing of the same image portion.

As to the green signal, the green signal of fifteen lines prior to the ideal line L (hatched triangle mark) is selected for the ideal line L. That is, the green signal of fifteen lines prior to the ideal line L is closer to the ideal line L than the green signal of fourteen lines prior to the ideal line L with respect to the reading timing of the same image portion.

As mentioned, the inter-line compensation portion 7 selects line of the blue and green signals against the ideal lines L of the red signal to form each line of color signals.

In the 166.7% mode, that is 500 dpi, as shown in FIG. 7, at first, 0th line of the green signal is read by the green color line image sensor 4b, and then, the first line of the green signal is read by the green color line image sensor 4b also. However, the intervals between the red and green line image sensors and between the red and blue line image sensors is not integer times the feeding rate. Therefore, the lines of red, blue, and green signals do not agree each other. Then, assuming that the line of the red signal is an ideal line L, the blue signal of two line prior to the ideal ling L (hatched round mark) is selected for the ideal line L. That is, the blue signal of two lines prior to the ideal line L is closer to the ideal line L than the blue signal of one line prior to the ideal line L with respect to the reading timing of the same image portion.

As to the green signal, the green signal of eighteen lines prior to the ideal ling L (hatched triangle mark) is selected for the ideal line L. That is, the green signal of eighteen lines prior to the ideal line L is closer to the ideal line L than the green signal of seventeen lines prior to the ideal line L with respect to the reading timing of the same image portion.

As mentioned, the inter-line compensation portion 7 selects line of the blue and green signals against the ideal lines L of the red signal to form each line of color signals.

In the 200% mode, that is, at 600 dpi, the intervals between the red line image sensor and the blue line image sensor and between the red image sensor and the green line image sensor are integer times the feeding rate. Therefore, as show in FIG. 8, the blue signal of just two lines prior the ideal line L corresponds to the ideal line of the red signal and the green signal of just twenty-two lines prior to the ideal line l agrees with the ideal line of the red signal. Therefore, these lines of the blue and green signals are selected as the ideal line L and outputted together with the ideal line of the red signal.

Therefore, the inter-line compensation portion 7 adjusts timings of reading outputs of the read blue, and green color signals such that the intervals between the green and blue color image sensors are adjusted such that the reading timings of blue and green signals are agreed with that of the red color signal to form a set of one line of color signals.

As mentioned according to the first embodiment, the color image reading apparatus is provided which comprises: the optical system 12 for projecting an image on the image plane 2; first to $N^{th}$ color line image sensors (4a to 4c) for receiving respective color images from the projected image on the image plane 2 and respectively generating first to $N^{th}$ color signals (Rsig, Gsig, Bsig), the first to $N^{th}$ color line image sensors (4a to 4c) respectively extending in the main scanning direction S1 and being arranged in the sub-scanning direction S2 in order from the first to $N^{th}$ color line image sensors (4a–4c) with different pitches (D1, D2) between the first to $(N-1)^{th}$ color line image sensors (4b, 4c) and the $N^{th}$ color line image sensor 4a; an enlargement ratio data receiving circuit 13 for receiving data of an enlargement ratio and for supplying data of a scanning pitch in accordance with the enlargement ratio; a scanning unit 3 responsive to the data of the scanning pitch for scanning the image against the first to $N^{th}$ color line image sensors (4a–4c) in the sub-scanning direction S2 at the scanning pitch in the order, wherein lines of the first to $(N-1)^{th}$ color line image sensors (4b, 4c) deviate from the lines of the $N^{th}$ color line image sensor 4a in accordance with the enlargement ratio; and a line combining portion 7 for selecting one of lines of each of the first to $(N-1)^{th}$ color signals closest to the present line of the $N^{th}$ color signal, combining the selected one of lines each of the first to $(N-1)^{th}$ color signals with the present line of the $N^{th}$ color signal, and for outputting the combined color signals.

A second embodiment will be described.

Figure 9:
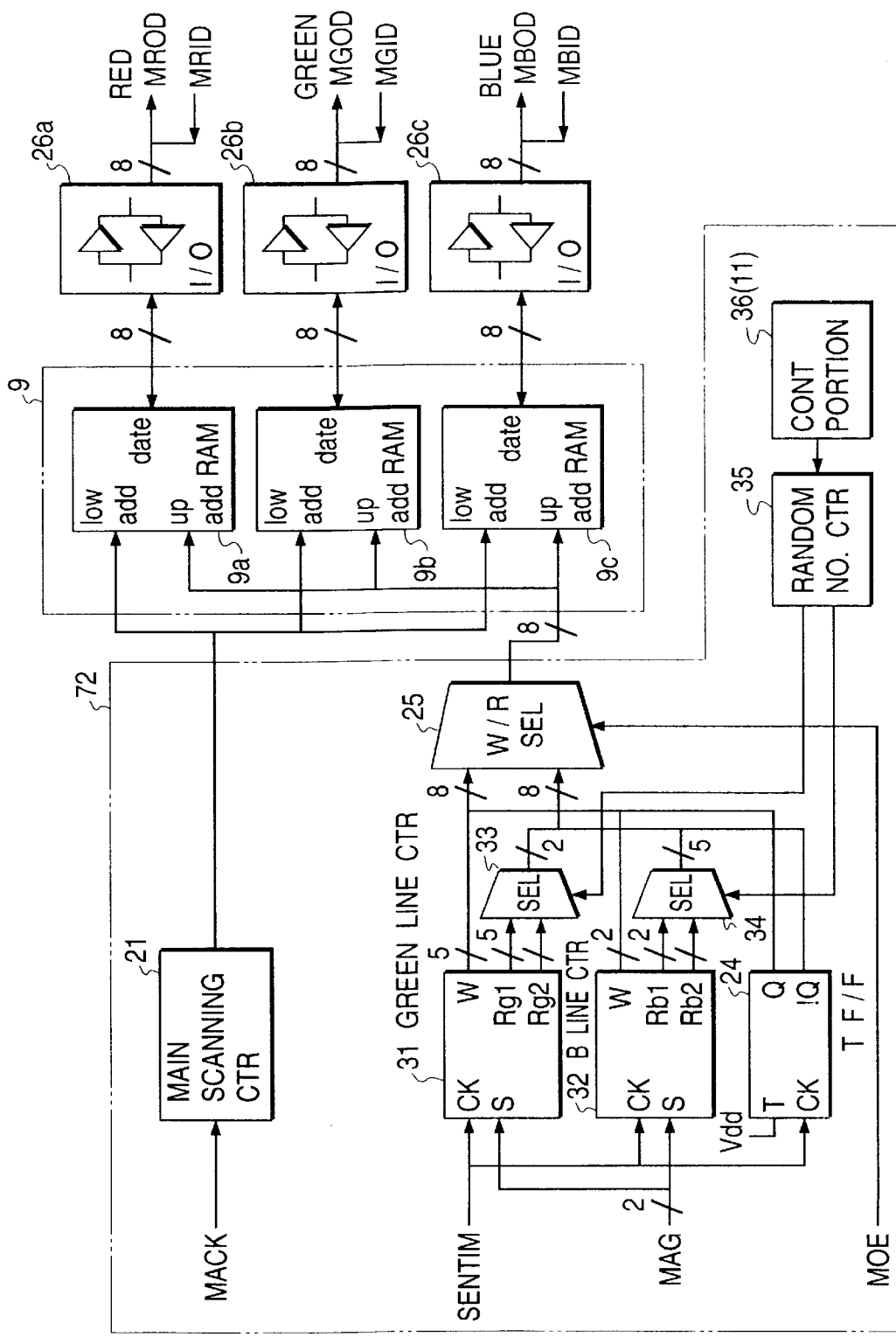
FIG. 9 is a block diagram of a second embodiment.

The structure and the operation of the second embodiment are substantially the same as those of the first embodiment. The difference is in the inter-line compensation portion. That is, the inter-line compensation portion 72 replaces the inter-line compensation portion 7 in the first embodiment. FIG. 9 is a block diagram of the second embodiment showing the inter-line compensation portion 72.

The inter-line compensation portion 72 comprises the main scanning counter 21 for counting pulses of the pixel synchronizing signal (MACK), a green line counter 31, responsive to the line synchronizing signal (SENTIM) and the counter value selection signal (MAG), for counting lines of the green signal and outputting green reading address signals (Rg1) and (Rg2) of the green signal or a green writing address signal (W) of the green signal, a blue line counter 32, responsive to the line synchronizing signal (SENTIM) and the counter value selection signal (MAG), for counting lines of the blue signal and outputting blue reading address signals Rb1 and Rb2 of the blue signal or a blue writing address signal (W) of the blue signal, and the red line counter 24, responsive to the line synchronizing signal (SENTIM) and the Vdd signal, for detecting completion of one line of the red signal and the W/R selector 25 responsive to the W/R counter selection signal (MOE) for selects either of the reading address signals from the green, blue, and red counters 31, 34, and 24 or the writing address signals from the green, blue, and red counters 31, 32, and 24 in accordance with the W/R and supplies selected signals to the memories 9.

The inter-line compensation further comprises a random number counter for generating a random selection signal, a control portion 36 for controlling the random number counter 25, a selector 33 for selectively supplies either of the green address signal Rg1 or Rg2 to the S/R selector 25 in accordance with the random selection signal, a selector 34 for selectively supplies either of the blue address signal Rb1 or Rb2 to the S/R selector 25 in accordance with the random selection signal. The control portion 36 is independently shown in FIG. 9. However, it is a portion of the system control portion 11 actually.

The green counter 31 outputs the green reading address signal Rg 1 which is closest to the ideal line L of the red signal and the green reading address signal Rg2 which is secondly closest to the ideal line L of the red signal. The blue counter 32 outputs the blue reading address signal Rb1 which is closest to the ideal line L of the red signal and the blue reading address signal Rb2 which is secondly closest to the ideal line L of the red signal.

Color signals (data) are read from the RAMs 9a to 9c in response to data output signals MROD, MGOD, and MBOD and color signals are written in the RAMs 9a to 9c in response to data input signal MRID, MGID, and MBID.

An operation of the second embodiment will be described.

Figure 10:
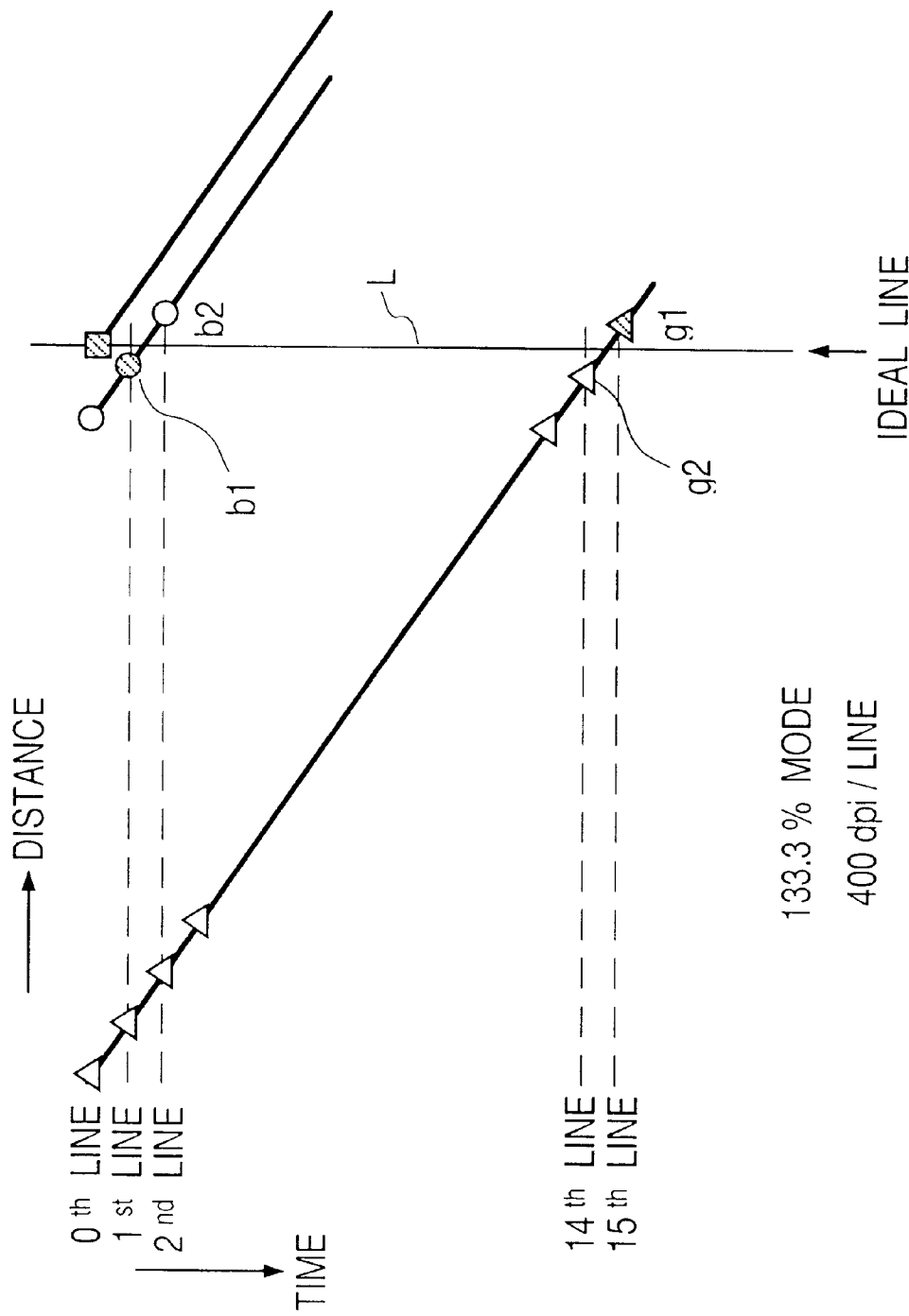
FIG. 10 is an illustration of the second embodiment illustrating the inter-line compensation at 400 dpi (133.3% mode)

FIG. 10 is an illustration of the modification of the first embodiment illustrating the inter-line compensation at 400 dpi (133.3% mode).

In the 133.3% mode, that is 400 dpi, as shown in FIG. 10, at first, 0th line of the green signal is read by the green color line image sensor 4b, and then, the first line of the green signal is read by the green color line image sensor 4b also.

However, the intervals between the red and green line image sensors and between the red and blue line image sensors is not integer times the feeding rate. Therefore, the lines of red, blue, and green signals do not agree each other. Then, assuming that the line of the red signal is an ideal line L, the first line of the blue signal is closest to the ideal line L with a deviation of 0. 333 lines (assuming an interval of two consecutive lines is 1.0) and the second line of the blue signal is secondly closest to the ideal line L with deviation of 0.667 line. The blue counter 32 outputs the blue signal of the closest line as b1 and the blue signal of the secondly closest line as b2.

Similarly, the fifteenth line of the green signal is closest to the ideal line L with a deviation of 0. 333 lines and the fourteenth line of the green signal is secondly closest to the ideal line L with deviation of 0.667 lines. The green counter 31 outputs the green signal of the closest line as g1 and the green signal of the secondly closest line as g2.

As mentioned, the green and blue counters 31 and 32 can output the reading addresses of the firstly and second closest lines and the selectors 33 and 34 selects either of the green and blue signals of the firstly and secondly closest lines in accordance with the random counter 35. That is, in the first embodiment as shown in FIG. 6, the closest lines of the green and blue signals are selected. However, in this embodiment, either of the green signal of the firstly closest line or the second closest line is selected randomly and either of the blue signal of the firstly closest line or the second closest line is selected randomly.

Figure 11:
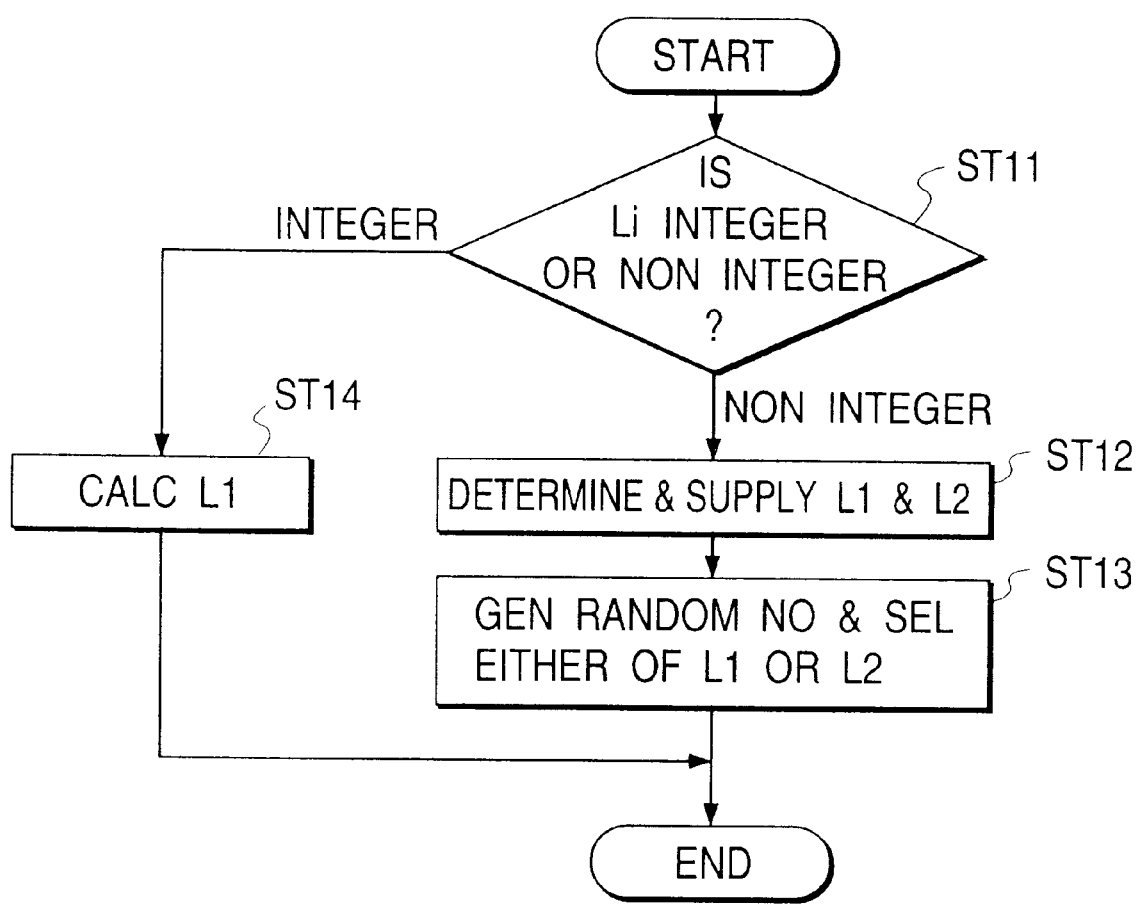
FIG. 11 is a flow chart of the second embodiment.

FIG. 11 is a flow chart of the second embodiment. In step st11, the system control portion 11 makes a decision as to whether the number of lines for compensation to the ideal line L is an integer or a non-integer. The system control portion 11 judges it in accordance with the enlargement ratio inputted. When the the number of line for compensation to the ideal line is an integer, the system control portion 11 calculates the closet line and supplies the data of the closest line to green counter 31 through the MAG signal in step st14. When the the number of lines for compensation to the ideal line is not an integer, the system control portion 11 calculates the firstly and secondly closet lines and supplies the data of the firstly and secondly closest lines to green counter 31 through the MAG signal in step st12. In the following step st13, the system control portion 11 (control portion 36) operates the random number counter 35 to select either of the Rg1 or Rg2 randomly. The above mentioned operation is for the green counter 31 and the same operation for the blue line counter 32 is executed substantially at the same time.

Then, the inter-line compensation is provided to combine the red, blue and green signals into a set of color signals every line with random selection operation mentioned above. Therefore, an color offset at an edge portion due to the blue or green signal is suppressed.

According to the second embodiment, the color image reading apparatus is provided which comprises: the optical system 12 for projecting an image on an image plane; first to $N^{th}$ color line image sensors (4a–4c) for receiving respective color images from the projected image on the image plane and respectively generating first to $N^{th}$ color signals, the first to $N^{th}$ color line image sensors respectively extending in the main scanning direction S1 and being arranged in the sub-scanning direction S2 in order from the first to $N^{th}$ color line image sensors (4a–4c) with different pitches between the first to $(N-1)^{th}$ color line image sensors (4b, 4c) and the $N^{th}$ color line image sensor 4a; an enlargement ratio data receiving circuit for receiving data of an enlargement ratio and for supplying data of a scanning pitch in accordance with the enlargement ratio; a scanning unite responsive to the data of the scanning pitch for scanning the image against the first to $N^{th}$ color line image sensors (4a–4c) in the sub-scanning direction at the scanning pitch in the order, wherein lines of the first to $(N-1)^{th}$ color line image sensors deviate from the lines of the $N^{th}$ color line image sensor 4a in accordance with the enlargement ratio; and a determining portion for determining first one (b1, g1) of lines of each of the first to $(N-1)^{th}$ color signals closest to the present line of the $N^{th}$ color signal and second one (b2, g2) of lines of each of the first to $(N-1)^{th}$ color signals secondly closest to the present line of the $N^{th}$ color signal; a selecting portion for randomly selecting either of the first one of line of each of the first to $(N-1)^{th}$ color signals or the second one of line of each of the first to $(N-1)^{th}$ color signals at a ratio; the line combining portion (72) for combining the one of lines of each of the first to $(N-1)^{th}$ color signals selected with the present line of the $N^{th}$ color signal and for outputting the combined color signals.

A modification of the second embodiment will be described.

Figure 12:
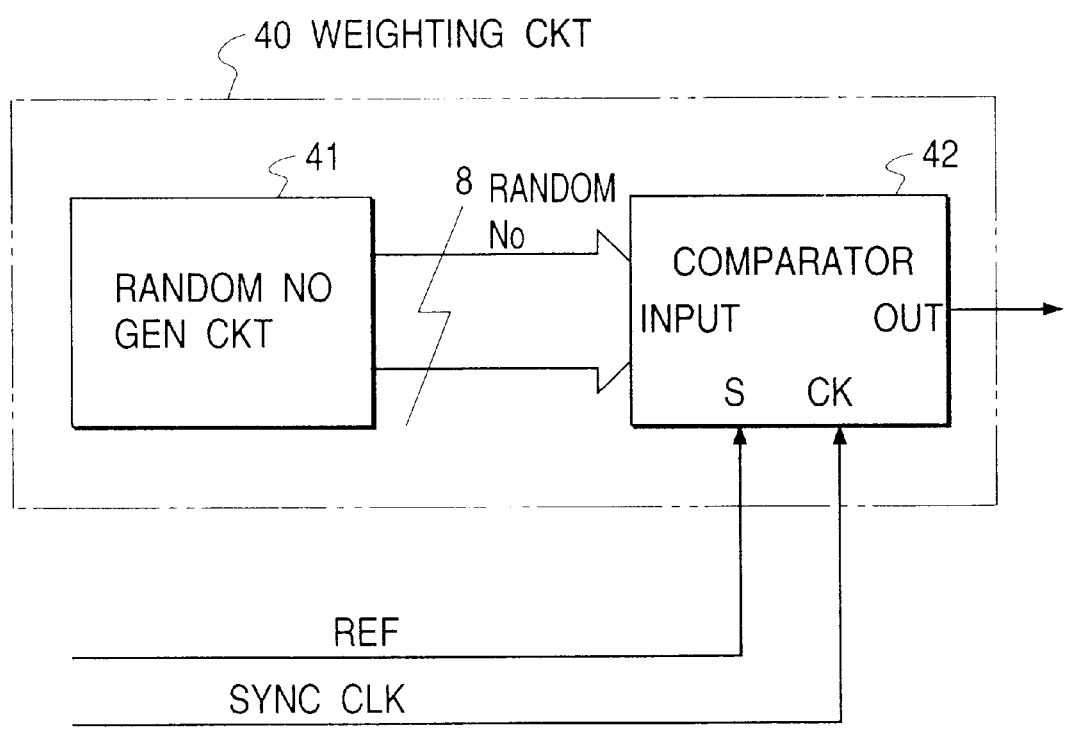
FIG. 12 is a block diagram of the modification of the second embodiment showing a weighting circuit.

FIG. 12 is a block diagram of the modification of the second embodiment showing a weighting circuit 40. This weighting circuit 40 replaces the random number circuit 35. The weighting circuit 40 comprises a random number generation circuit 41 for generating a random number between 0 to 255 and a comparator 42 for comparing the random number from the random number generation circuit 41 with a reference value REF inputted and for supplying the result to the selectors 33 and 34.

The reference value is 85 for example. Then, the output of the comparator is given as follows:

When the random number≧the reference value, the output is 0 (1)

When the random number<the reference value, the output is 1 (2)

Then, (1):(2)=1:2

Therefore, the weighted selection signal is provided.

Figure 13:
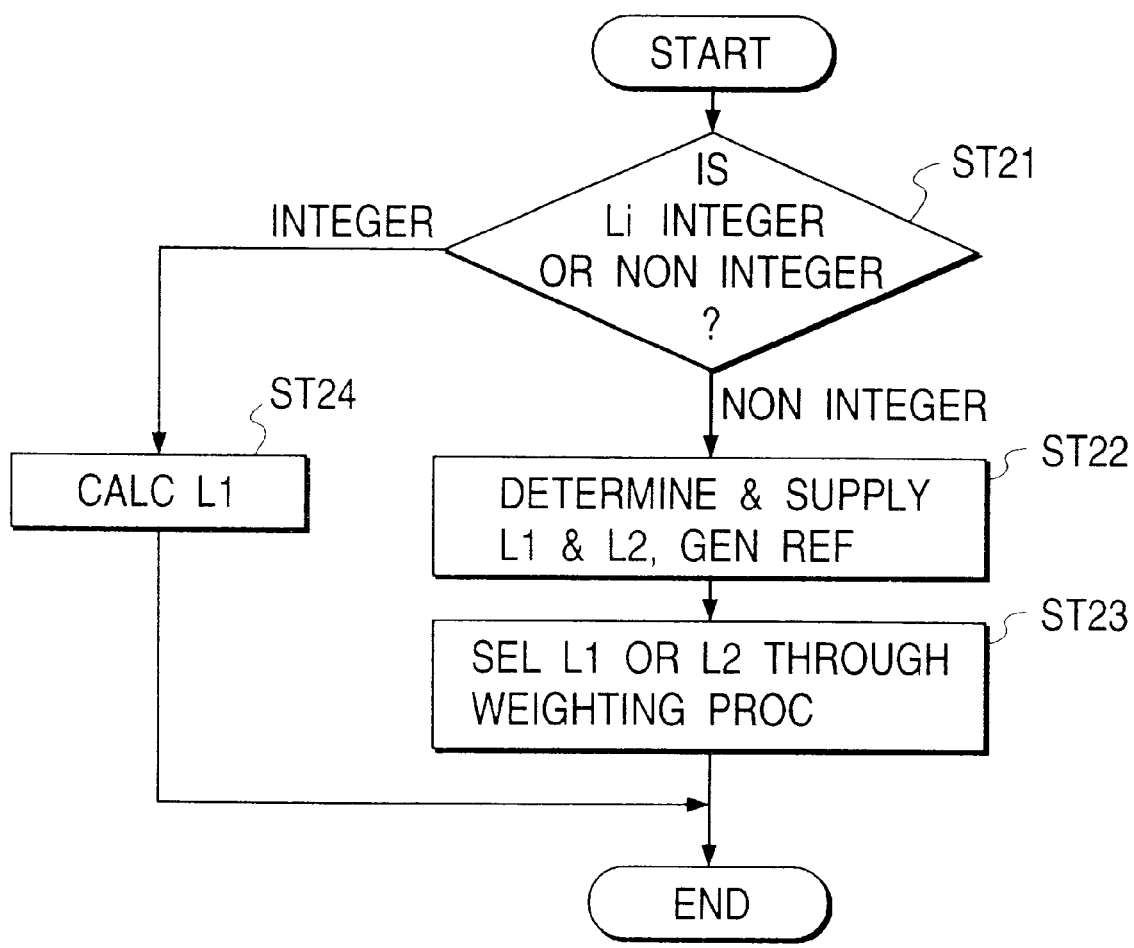
FIG. 13 is a flow chart of the modification of the second embodiment showing the operation of the system control portion 11 for providing weighted selection operation.

FIG. 13 is a flow chart of the modification of the second embodiment showing the operation of the system control portion 11 for providing a weighted selection operation.

In step st21, the system control portion 11 makes a decision as to whether the number of lines for compensation to the ideal line L is an integer or a non-integer. The system control portion 11 judges it in accordance with the enlargement ratio inputted. When the the number of line for compensation to the ideal line is an integer, the system control portion 11 calculates the closest line and supplies the data of the closest line to green counter 31 through the MAG signal in step st24. When the the number of lines for compensation to the ideal line is not an integer, the system control portion 11 calculates the firstly and secondly closet lines and supplies the data of the firstly and secondly closest lines to green counter 31 through the MAG signal and generates and supplies the reference value to the comparator 42 in step st22. In the following step st23, the system control portion 11 (control portion 36) operates the selectors 33 and 34 to select either of the Rg1 or Rg2 with weighting. The above mentioned operation is for the green counter 31 and the same operation for the blue line counter 32 is executed substantially at the same time.

Then, the inter-line compensation is provided to combine the red, blue and green signals into a set of color signals every line with weighted selection between the firstly and secondly closest lines mentioned above. Therefore, an color offset at an edge portion due to the blue or green signal is further suppressed.

The weighting operation will be further described.

In step st22, the reference value is generated as follows:

The possibilities of selection between the firstly closest line and the secondly closest line are determined in accordance with the deviation from the ideal line L. More specifically, the ratio between the g1 and g2 are given by:

g1:g2=1:2

Therefore the frequencies of the g1 and g2 are given by inversions of the distance between lines of the blue and green signals and the ideal line as follows:

frequency of g1:frequency of g2=2:1

Similarly, frequency of b1:frequency of b2=2:1

Therefore, the reference value REF is determined to provide the frequencies of g1, g2, b1, and b2 as mentioned.

A similar operation is also provided for the b1 and b2.

Therefore, the color offset at an edge portion due to the blue or green signal is further suppressed.

What is claimed is:

1. An image reading apparatus comprising:
    a CCD line image sensors having a plurality of photoelectric conversion elements for reading red, green blue images;
    carriage means for carrying a copy;
    changing means for changing a carrying speed of said carriage means in accordance with an enlargement ratio; and
    inter-line compensation means for outputting red, green, and blue signals from said CCD line image sensors with output timings of said red, green, and blue signals adjusted to combine respective said red, green, and blue signals to form a line;
    wherein said carriage means and said changing means generate deviations of lines of two of said red, green, and blue signals from the line of the remaining signal in accordance with said enlargement ratio and said inter-line compensation means compensates said deviation by outputting said red, green, and blue signals by changing outputting timings of said red, green, and blue signals so as to select one of lines of said two of said red, green and blue signals closest to the line to be read.

2. An image reading apparatus comprising:
    a CCD line image sensors having a plurality of photoelectric conversion elements for reading red, green blue images;
    carriage means for carrying a copy;
    changing means for changing a carrying speed of said carriage means in accordance with an enlargement ratio; and
    inter-line compensation means for outputting red, green, and blue signals from said CCD line image sensors with output timings of said red, green, and blue signals adjusted to combine respective said red, green, and blue signals to form a line;
    wherein said carriage means and said changing means generate deviations of lines of two of said red, green, and blue signals from the line of the remaining signal in accordance with said enlargement ratio and said inter-line compensation means compensates said deviation by outputting said red, green, and blue signals by changing outputting timings of said red, green, and blue signals so as to select either of lines of said two of said red, green and blue signals closest or second closest to the line to be read.

3. An image reading apparatus as claimed in claim 2, wherein said inter-line compensation means selects either of lines of said two of said red, green and blue signals closest or second closest to the line to be read through a random number operation.

4. An image reading apparatus as claimed in claim 3, wherein said inter-line compensation means selects either of lines of said two of said red, green and blue signals closest or second closest to the line to be read through a random number operation in accordance with ratios of distances between the lines of two of said red, green and blue signal and the remaining signal.

5. An image reading apparatus comprising:
    CCD image sensors, having a plurality of photoelectric conversion elements, for reading read, green and blue images;
    carriage means for carrying a copy;
    setting means for setting a predetermined enlargement ratio;
    reading means for storing a plurality of kinds of data corresponding to respective output timings of respective photoelectric conversion elements and selecting data of said respective output timings in accordance with said enlargement ratio set by said setting means;
    speed changing means for changing a speed of said carriage means in accordance with the read data from said reading means;
    inter-line compensation means for changing output timings of image data from said respective photoelectric conversion elements in accordance with a change of said speed of said carriage means such that a plurality of reading lines of respective colors are combined into one line; and
    skipingly reading means for effecting a skipingly reading processing to output of said inter-line compensation means to output the color output signal having said enlargement ratio;
    wherein said carriage means and said changing means generate deviations of lines of two of said red, green, and blue signals from the line of the remaining signal in accordance with said enlargement ratio and said inter-line compensation means compensates said deviation by outputting said red, green, and blue signals by changing outputting timings of said red, green, and blue signals so as to select one of lines of said two of said red, green and blue signals closest to the line to be read.

6. An image reading apparatus comprising:
    CCD image sensors, having a plurality of photoelectric conversion elements, for reading read, green and blue images;
    carriage means for carrying a copy;
    setting means for setting a predetermined enlargement ratio;
    reading means for storing a plurality of kinds of data corresponding to respective output timings of respective photoelectric conversion elements and selecting data of said respective output timings in accordance with said enlargement ratio set by said setting means;
    speed changing means for changing a speed of said carriage means in accordance with the read data from said reading means;

inter-line compensation means for changing output timings of image data from said respective photoelectric conversion elements in accordance with a change of said speed of said carriage means such that a plurality of reading lines of respective colors are combined into one line; and skipingly reading means for effecting a skipingly reading processing to output of said inter-line compensation means to output the color output signal having said enlargement ratio;

wherein said carriage means and said changing means generate deviations of lines of two of said red, green, and blue signals from the line of the remaining signal in accordance with said enlargement ratio and said inter-line compensation means compensates said deviation by outputting said red, green, and blue signals by changing outputting timings of said red, green, and blue signals so as to select either of lines of said two of said red, green and blue signals closest or second closest to the line to be read.

7. An image reading apparatus as claimed in claim 6, wherein said inter-line compensation means selects either of lines of said two of said red, green and blue signals closest or second closest to the line to be read through a random number operation.

8. An image reading apparatus as claimed in claim 7, wherein said inter-line compensation means selects either of lines of said two of said red, green and blue signals closest or second closest to the line to be read through a random number operation in accordance with ratios of distances between the lines of two of said red, green and blue signal and the remaining signal.

9. A color image reading apparatus, comprising:

an optical system for projecting an image on an image plane;

first to $N^{th}$ color line image sensors for receiving respective color images from said projected image on said image plane and respectively generating first to $N^{th}$ color signals, said first to $N^{th}$ color line image sensors respectively extending in a main scanning direction and being arranged in a sub-scanning direction in order from said first to $N^{th}$ color line image sensors with different pitches between said first to $(N-1)^{th}$ color line image sensors and said $N^{th}$ color line image sensor;

enlargement ratio data receiving means for receiving data of an enlargement ratio and for supplying data of a scanning pitch in accordance with said enlargement ratio;

scanning means responsive to said data of said scanning pitch for scanning said image against said first to $N^{th}$ color line image sensors in said sub-scanning direction at said scanning pitch in said order, wherein lines of said first to $(N-1)^{th}$ color line image sensors deviate from the lines of said $N^{th}$ color line image sensor in accordance with said enlargement ratio; and line combining means for selecting one of lines of each of said first to $(N-1)^{th}$ color signals closest to the present line of said $N^{th}$ color signal, combining said selected one of lines each of said first to $(N-1)^{th}$ color signals with the present line of said $N^{th}$ color signal, and for outputting the combined color signals.

10. A color image reading apparatus, comprising:

an optical system for projecting an image on an image plane;

first to $N^{th}$ color line image sensors for receiving respective color images from said projected image on said image plane and respectively generating first to $N^{th}$ color signals, said first to $N^{th}$ color line image sensors respectively extending in a main scanning direction and being arranged in a sub-scanning direction in order from said first to $N^{th}$ color line image sensors with different pitches between said first to $(N-1)^{th}$ color line image sensors and said $N^{th}$ color line image sensor;

enlargement ratio data receiving means for receiving data of an enlargement ratio and for supplying data of a scanning pitch in accordance with said enlargement ratio;

scanning means responsive to said data of said scanning pitch for scanning said image against said first to $N^{th}$ color line image sensors in said sub-scanning direction at said scanning pitch in said order, wherein lines of said first to $(N-1)^{th}$ color line image sensors deviate from the lines of said $N^{th}$ color line image sensor in accordance with said enlargement ratio; and determining means for determining first one of lines of each of said first to $(N-1)^{th}$ color signals closest to the present line of said $N^{th}$ color signal and second one of lines of each of said first to $(N-1)^{th}$ color signals secondly closest to the present line of said $N^{th}$ color signal;

selecting means for randomly selecting either of said first one of line of each of said first to $(N-1)^{th}$ color signals or said second one of line of each of said first to $(N-1)^{th}$ color signals based on a ratio;

line combining means for combining said one of lines of each of said first to $(N-1)^{th}$ color signals selected by said selecting means with the present line of said $N^{th}$ color signal and for outputting the combined color signals.

11. A color image reading apparatus as claimed in claim 10, further comprising: detecting means for detecting a first deviation between said first one of line of each of said first to $(N-1)^{th}$ color signals and said present line of said $N^{th}$ color signal and second deviation between said second one of line of each of said first to (N-1) th color signals and said present line of said $N^{th}$ color signal; and weighting means for weighting said ratio in accordance with said detected first and second deviations.

12. A method of reading a color image comprising the steps of:

projecting an image on an image plane;

providing first to $N^{th}$ color line image sensors for receiving respective color images from said projected image on said image plane and respectively generating first to $N^{th}$ color signals, said first to $N^{th}$ color line image sensors respectively extending in a main scanning direction and being arranged in a sub-scanning direction in order from said first to $N^{th}$ color line image sensors with different pitches between said first to $(N-1)^{th}$ color line image sensors and said $N^{th}$ color line image sensor;

receiving data of an enlargement ratio and for supplying data of a scanning pitch in accordance with said enlargement ratio;

scanning said image against said first to $N^{th}$ color line image sensors in said sub-scanning direction at said scanning pitch in said order in response to said data of said scanning pitch, wherein lines of said first to $(N-1)^{th}$ color line image sensors deviate from the lines of said $N^{th}$ color line image sensor in accordance with said enlargement ratio; and selecting one of lines each of said first to $(N-1)^{th}$ color signals closest to the present line of said $N^{th}$ color signal;

combining said selected one of lines of each of said first to $(N-1)^{th}$ color signals with the present line of said $N^{th}$ color signal; and outputting the combined color signals.

13. A method of reading a color image comprising the steps of:

for projecting an image on an image plane;

providing first to $N^{th}$ color line image sensors for receiving respective color images from said projected image on said image plane and respectively generating first to $N^{th}$ color signals, said first to $N^{th}$ color line image sensors respectively extending in a main scanning direction and being arranged in a sub-scanning direction in order from said first to $N^{th}$ color line image sensors with different pitches between said first to $(N-1)^{th}$ color line image sensors and said $N^{th}$ color line image sensor;

receiving data of an enlargement ratio and for supplying data of a scanning pitch in accordance with said enlargement ratio;

scanning said image against said first to $N^{th}$ color line image sensors in said sub-scanning direction at said scanning pitch in said order in response to said data of said scanning pitch, wherein lines of said first to $(N-1)^{th}$ color line image sensors deviate from the lines of said $N^{th}$ color line image sensor in accordance with said enlargement ratio; and determining first one of lines of each of said first to $(N-1)^{th}$ color signals closest to the present line of said $N^{th}$ color signal and second one of lines of each of said first to $(N-1)^{th}$ color signals secondly closest to the present line of said $N^{th}$ color signal;

randomly selecting either of said first one of line of each of said first to $(N-1)^{th}$ color signals or said second one of line of each of said first to $(N-1)^{th}$ color signals based on a ratio;

combining said one of lines of each of said first to $(N-1)^{th}$ color signals selected by said selecting means with the present line of said $N^{th}$ color signal; and outputting the combined color signals.

14. A method of reading a color image as claimed in claim 13, further comprising the steps of:

detecting a first deviation between said first one of line of each of said first to $(N-1)^{th}$ color signals and said present line of said $N^{th}$ color signal and second deviation between said second one of line of each of said first to $(N-1)^{th}$ color signals and said present line of said $N^{th}$ color signal; and weighting said ratio in accordance with said detected first and second deviations.

* * * * *